United States Patent [19]

Tabita

[11] Patent Number: 4,891,904
[45] Date of Patent: Jan. 9, 1990

[54] HEATING DEVICE FOR ELECTRIC MOSQUITO KILLING APPARATUS

[75] Inventor: Yoshikatsu Tabita, Wakayama, Japan

[73] Assignee: King Chemical Kabushikigaisha, Arida, Japan

[21] Appl. No.: 343,632

[22] Filed: Apr. 27, 1989

[51] Int. Cl.⁴ ............................................. A01M 1/22
[52] U.S. Cl. ...................................................... 43/112
[58] Field of Search ......................................... 43/112

[56] References Cited

U.S. PATENT DOCUMENTS

| 3,685,198 | 8/1972 | Smith | 43/112 |
| 4,165,577 | 8/1979 | Shanahan et al. | 43/112 |
| 4,785,573 | 11/1988 | Millard | 43/112 |

Primary Examiner—M. Jordan
Attorney, Agent, or Firm—Armstrong, Nikaido, Marmelstein, Kubovcik & Murray

[57] ABSTRACT

A heating device for electric mosquito killing apparatus is constructed by fixing a heating assembly comprising upper and lowed insulating members and a heating element arranged to be fed with electric current on the under face of a heat receiving plate having a plane for loading a mosquito killing mat thereon for evaporation by electric heating, each central part of the constituent members being provided with a hole for insertion of a sucking wick of a size allowing formation of a gap for evaporation of liquid mosquitocide around the wick.

3 Claims, 2 Drawing Sheets

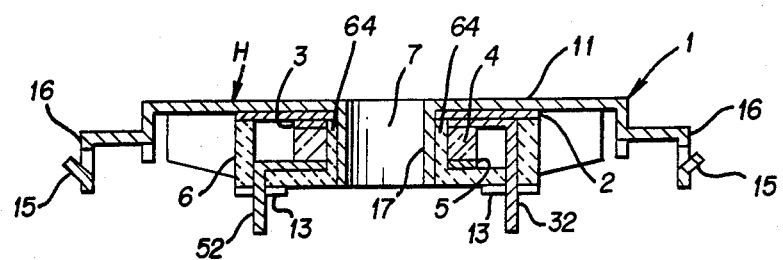
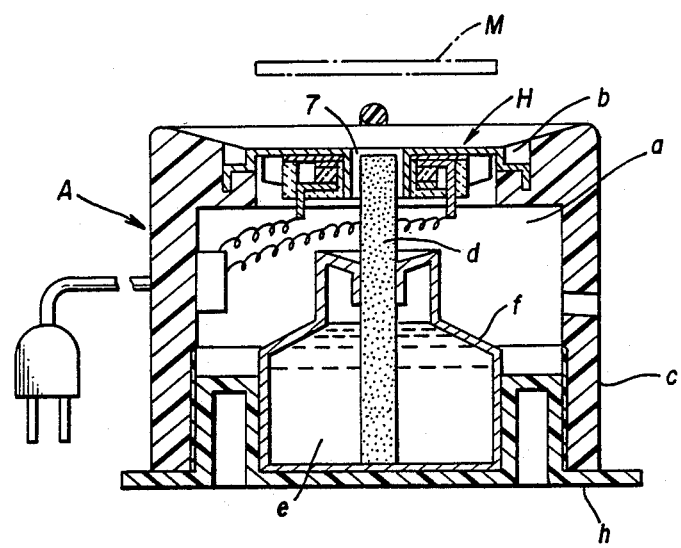

HEATING DEVICE FOR ELECTRIC MOSQUITO KILLING APPARATUS

BACKGROUND OF THE INVENTION

1. FIELD OF THE INVENTION

The present invention concerns heating devices for electric mosquito killing apparatus.

2. PRIOR ART

Electric mosquito killing apparatus include a mat heating type apparatus in which a mosquito killing mat impregnated with mosquitocide component is heated on a heating plate for evaporating the mosquitocide component, and a wick heating type apparatus in which a liquid mosquitocide sucked up from a container by means of a sucking wick is heated for evaporation. In the both types evaporation of the mosquitocide component is effected by means of an electric heating device. The heating device used for the former type electric mosquito killing apparatus i.e. the mat heating type has a plate-shaped construction comprising a heat receiving plate, to the under surface of which a heater is attached and, on the top surface of which the mosquito killing mat is to be placed. While the heating device of the latter type electric mosquito killing apparatus has a construction which is provided with a wick insertion hole in which the sucking wick is to be inserted for evaporating the liquid mosquitocide by heating the sucking wick with a heater from surroundings.

SUMMARY OF THE INVENTION

The above heating devices for the electric mosquito killing apparatus have such a disadvantage that they involves poor economy, since they must be manufactured with different constructions depending on their different heating types v.z., the mat heating type and the wick heating type.

Another disadvantage involved in the above prior art is that, when heating the mosquito killing mat placed on a flat heating device, central part of the heating device gets hotter than the peripheral part and, as a result, the central part of the mosquito killing mat is heated concentrically, thus making it impossible to effect a uniform and effective evaporation of the mosquitocide component. While, when evaporating the liquid mosquitocide sucked up with the sucking wick by heating from the surrounding of the sucking wick, there was a defect of a large loss of liquid mosquitocide, because it sometimes happens that the liquid mosquitocide condenses and adheres to the top face around the wick insertion hole without evaporation.

The present invention can be commonly used without any trouble as a heating device for an electric mosquito killing apparatus of the mat heating type and also as a heating device for that of the wick heating type.

Namely, when it is used as the heating device for electric mosquito killing apparatus of the mat heating type, it can evaporate the mosquitocide component inpregnated in the mosquito killing mat uniformly and effectively, and when it is used as the heating device for electric mosquito killing apparatus of the wick heating type in which the surroundings of the sucking wick is heated with a heater, it can effectively evaporate the liquid mosquitocide without condensation.

The heating device for the electric mosquito killing apparatus of the present invention described above is provided with a mat loading plane on which the mosquito killing mat is to be heated by a electric heater and, also is provided at the center of the mat loading plane, with a wick insertion hole into which a sucking wick is to be inserted for sucking the liquid mosquitocide to evaporate with heating, the size of the wick insertion hole being such that a gap for evaporation is formed between the sucking wick and the inner surface of the hole. Therefore, it can be used without any trouble as the heating device for the electric mosquito killing apparatus of the mat heating type and also as the heating device for the electric mosquito killing apparatus of the wick heating type.

Consequently, the present invention enables mass production providing an economical device, since the heating device of the present invention can be used with both of the afore-mentioned two types of electric mosquito killing apparatus without necessity of employing different parts for different types.

Moreover, the wick insertion hole provided at the center of the mat loading plane functions so as to prevent concentrical heating of the central part of the mat loading plane and assures a uniform and effective evaporation of the mosquitocide component from the mat placed on the plane.

In addition, when the heating device for the electric mosquito killing apparatus of the present invention is used for an electric mosquito killing apparatus of the wick heating type in which the surroundings of the sucking wick is heated with a heater, it can evaporate the mosquitosid component sucked up through the sucking wick, by heating the latter in the wick insertion hole which has a gap for evaporation, and it can also evaporate the liquid mosquitoside effectively and without loss, which is about to condense on the heat receiving plate, by the heat of the heat receiving plate.

BRIEF DESCRIPTION OF THE DRAWINGS

The purpose and the features of the present invention are clearly indicated by an illustrative example of the present invention.

FIG. 2 is a cross-sectional view of the heating device in assembled state, and

FIG. 3 is a cross-sectional view showing an example of an evaporating type of electric mosquito killing apparatus incorporating the heating device of the present invention.

DETAILED DESCRIPTION OF THE INVENTION

Figure 1:
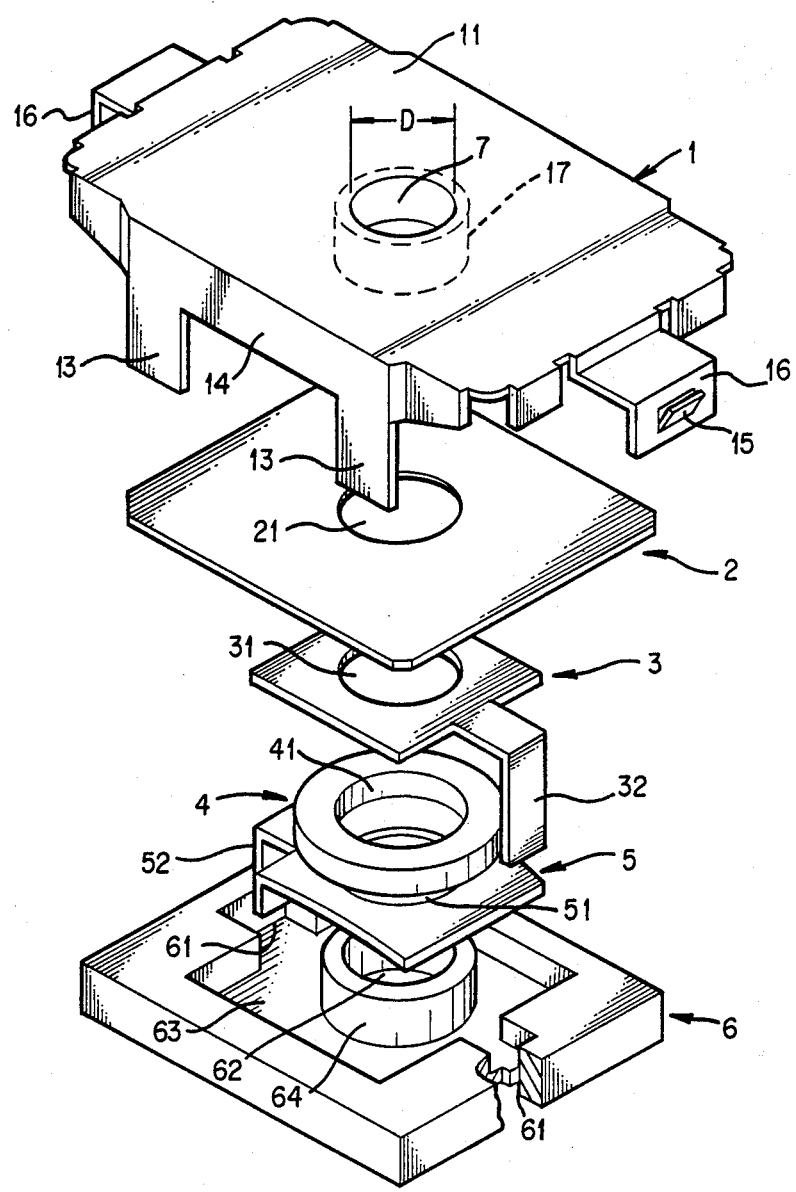
FIG. 1 is an exploded perspective illustration showing a preferred embodiment of a heating device for electric mosquito killing apparatus according to the present invention.

Now, with reference to the accompanying drawings, the present invention will be described by way of example.

Referring to FIGS. 1, 2, one embodiment of the heating device in accordance with the present invention includes a metallic heat receiving plate 1 constructed such that it forms a mat loading plane 11 on which a rectangular mosquito killing mat M is to be loaded for evaporating the mosquitocide component by electric heater, and it is protrusively provided on the under face of the central part with a cylindrical element 17 which forms a wick insertion hole 7 for a sucking wick d with a diameter D, the hole providing a gap for evaporation between its inner face and the sucking wick d. On a pair of opposite edges of the mat loading plane 11, there is formed a holding frame 14 which has two pairs of holding claws 13 formed by bending. Also formed on another pairs of opposite edges are standing fastening legs 16 which have blanked fastening claws 15.

The heating device also comprises a heat-resistant insulating plate 2 which is attached to the under face of the heat receiving plate 1 and provided at the central part with a first hole 21 for insertion of the cylindrical element 17 of the heat receiving plate 1.

The heating device further comprises a metallic top plate 3 to be placed between the heat resistant insulating plate 2 and a heating element 4 mentioned later. The top plate 3 is provided at the central part with a first hole 31 for insertion of a ring element 64 of an insulating box 6 mentioned later, and at the edge, also with a first connection terminal 32 pending therefrom for feeding electric current.

The heating device further includes the heating element 4 consisting of positive temperature coefficient thermistor with a thickness of 3–5 mm and is of a ring shape having at the central part a second hole 41 for insertion of the ring element 64 and having the same diameter as that of the first hole 31 for insertion of the ring element 64.

The heating device also comprises a metallic bottom contact plate 5 to be placed on the under face of the heating element 4. And, in order to assume good contact at the upper face, the contact plate 5 is made in a convex form and is provided at the central part with a third hole 51 for insertion of the ring element 64 and with a second connection terminal 52 pending therefrom for feeding electric current, the diameter of the third hole 51 being equal to that of the second hole 41.

The heating device further comprises an insulating box 6 which is constituted with insulating material such as ceramic, etc., and it has electric terminal receiving holes 61 formed at left and right sides on the bottom thereof and a concave portion 63 for housing the heating element 4. At the central portion of the concave portion part 63, there is formed a projection 64 which is provided with a second hole 62 for insertion of the cylindrical element 17. Said insulating box 6 is attached to the under face of the heat receiving plate 1 through the insulating plate 2 and fixedly held by the fastening claws 13.

The above-mentioned constituent members are assembled in the following way as shown in the cross-sectional view of FIG. 2. The ring element 64 protrusively formed at the central part of the concave part 63 serves as a supporting shaft in assembling:

The bottom contact plate 5 is first installed on the concave part 63 with the second connection terminal 52 passed through the hole 61 on one side. Next, the heating element 4 is placed on this bottom contact plate 5, the top contact plate 3 is placed on the heating element 4 and the first connection terminal 32 of this top contact plate 3 is passed through the hole 61 on the other side. Thereafter, those bottom contact plate 5, heating element 4 and top contact plate 3 are housed in the insulating box 6 and the opening face of the concave part 63 is closed with the insulating plate 2 to make up a heating assembly. This heating assembly is put on the cylindrical element 17 to be housed within the holding frame 14 through the ring 64, and then the fastening claws 13 are bent to the under face of the insulating box 6 to complete the assembling.

The heating device H for electric mosquito killing apparatus thus assembled can be used as either a heating device for electric mosquito killing apparatus of the mat heating type or that for electric mosquito killing apparatus of the wick heating type.

In case where the present heating device H is used for the electric mosquito killing apparatus of the wick heating type, as shown in FIG. 3 for example, it can be installed in an apparatus A comprising a cover c provided with an opening b above a container room a and a holding basement h for holding a liquid mosquitocide container f from which the mosquitocide e is sucked up through the wick d, with the fastening claws 15 of the fastening legs 16 fixedly engaged with the opening b.

And, if the container f of the liquid mosquitocide is placed in the container room a held by the holding basement, with the tip of the sucking wick d inserted in the wick insertion hole 7 and electric current is fed to the heating device H, evaporation of the liquid mosquitocide e sucked up by the wick d can be effected at the part of the hole 7, with the heating element 4 heated. On the other hand, if the mosquito killing mat M placed on the heating device H without using the container f, evaporation of the mosquitocide component by heating the mat M can also be effected with electric current fed to heat the mat M.

In the above-mentioned embodiment, the heating assembly of the present invention is constructed by assembling the bottom contact plate 5, the ring-shaped heating element 4 and the top contact plate 3 in the concave part 63 of the insulating box 6 and then closing by the insulating plate 2. However, it is also possible that the insulating box 6 is made as a plate-shaped insulator, such a heating element as adapted for feeding of electric current therethrough is directly placed on the under face of the insulating plate 2, and the heating assembly comprised of the insulating plate 2, the heating element 4 and the plate-shaped insulator is placed on the under face of the heat receiving plate 1 and fixed by caulking with a cylindrical fixture by using the wick insertion hole 7.

In this latter case, the surface of the heat receiving plate 1 of the plane 11 on which the mat is loaded must be provided such that the cylindrical element may not protrude above the surface of the heat receiving plate 1 so as to assure stable loading of the mat.

What is claimed is:

1. A heating device for electric mosquito killing apparatus comprising:
    a heat receiving plate 1 with a plane 11 for loading thereon a mosquito killing mat (M) impregnated with mosquitocide to be evaporated by electric heating, and
    a heating assembly fixed on the under face of said heat receiving plate (1) and consisted of upper and lower insulating members (2, 6) and a heating element (4) arranged to be fed with electric current and sandwiched between said upper and lower insulating members(2, 6),
    each of the heat receiving plate (1) and the heating assembly being provided at central portion thereof with a wick insertion hole (7) of a size allowing formation of a gap between its inner face and the sucking wick(d).

2. A heating device for electric mosquito killing apparatus comprising:
    a heat receiving plate (1) having a plane (11) for loading thereon a mosquito killing mat M impregnated with mosquitocide to be evaporated by electric heating and having a cylindrical element (17)

formed at central portion pending therefrom, said cylindrical element having a wick insertion hole (7), an insulating plate (2) having at central portion a first hole (21) for insertion of the cylindrical body (17), an insulating box (6) provided with a cavity (63) and fixed through the insulating plate (2) to the under face of the heat receiving plate (1), an heating element (4) housed in the cavity (63) and arranged to be fed with electric current, each of the insulating plate (2), the heating element (4) and the insulating box (6) being provided at central portion thereof with a hole (21, 41, 62) for insertion of the cylindrical element (17), said holes having a size allowing formation of a gap between their inner face and the sucking wick (d).

3. The heating device for electric mosquito killing apparatus according to claim 2, wherein, the insulating box (6) is made as a plate-shaped insulator, a heating element (4) arranged to be fed with electric current is placed between said insulating plate (2) and the insulator (6) and the heating assembly consisted of the insulating plate 2, the insulator (6) and the heating element (4) is placed on the under face of the heat receiving plate 1 and fixed by caulking with a cylindrical fixture by using the hole (7) for insertion of a wick(d).

* * * * *